United States Patent Office 2,772,277
Patented Nov. 27, 1956

2,772,277

THIAZOLYLMERCAPTOALKANEDIONES

John J. D'Amico, Charleston, W. Va., assignor to Monsanto Chemical Company, St. Louis, Mo., a corporation of Delaware No Drawing. Application November 25, 1952,
Serial No. 322,571

12 Claims. (Cl. 260—306)

The present invention relates to a new class of polyfunctional compounds characterized by the presence of a mercaptothiazolyl group and at least two carbonyl groups as for example thiazolylmercapto acetoacetates. The invention also relates to the preparation of these compounds.

The new class of compounds possess the structural formula $$\begin{array}{c} O=C-R' \\ | \\ R-S-R \\ | \\ O=C-R'' \end{array}$$

where T represents a thiazolyl group, R represents an alkylene group, R' represents an alkyl or alkoxy group and R'' represents a hydrocarbon group. Suitable examples of thiazolyl groups are 4,5-dimethyl thiazolyl, 4-methyl thiazolyl, naphtho thiazolyl, 5-chlorobenzothiazolyl, 4-ethyl thiazolyl, 4,5-diethyl thiazolyl, 4-methyl benzothiazolyl, phenyl benzothiazolyl, 4-propyl thiazolyl, 4-butyl thiazolyl, 5-carbomethoxy 4-methyl 2-thiazolyl, 5-carboethoxy 4-methyl 2-thiazolyl, 5-carbobutoxy 4-methyl 2-thiazolyl and 4-methyl 5-acetyl thiazolyl groups. Suitable alkyl groups are ethyl, propyl, isopropyl, butyl, isobutyl, tert.-butyl, amyl, hexyl, octyl, and decyl groups. Suitable alkoxy groups are illustrated by propoxy, isopropoxy, amyloxy, heptyloxy and nonyloxy groups.

These compounds may be prepared by condensing a mercaptothiazole with a halogenated alkylene dicarbonyl compound in which the halogen is attached to a carbon atom adjacent to one carbonyl group and not more than one carbon atom removed from the other. Halogen halide or metal halide is removed in the condensation resulting in the formation of the desired products. Suitable reactants include ethyl α-chloro acetoacetate, ethyl α-chloro α-propionyl propionate, α-chloro butyl acetic ester CH₃CH₂CH₂COCHClCOOR, α-chloro propionyl acetic acid ester

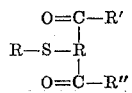

α-chloro α-butyryl butyric acid ester

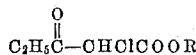

α-chloro α-heptoyl heptylic acid ester

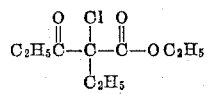

α-chloro heptoacetic ester

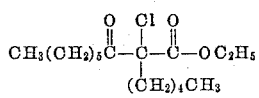

ethyl α-chloro trichloro acetoacetate

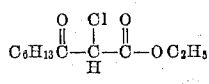

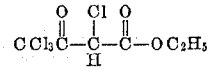

α-chloro acetoacetic methyl ester, α-chloro methyl acetoacetic methyl ester, α-chloro ethyl acetoacetic methyl ester, α-chloro ethyl acetoacetic ethyl ester, α-chloro butyryl acetic methyl ester and α-chloro decanoyl acetic ethyl ester.

The following examples illustrate in detail the preparation of the new compounds.

EXAMPLE 1

A solution of potassium 2-mercaptobenzothiazole was prepared by mixing 95-grams (0.55 mole) of 97% 2-mercaptobenzothiazole, 30.8 grams (0.55 mole) of potassium hydroxide, 550 ml. of acetone, and 22 grams of water. To this stirred solution 90.5 grams (0.55 mole) of ethyl α-chloroacetoacetate was added. An exothermic reaction set in, the temperature rising from 30 to 52° C. within 5 minutes. The reaction mixture was stirred for 8 hours, and let stand for an additional 8 hours. The potassium chloride was recovered by filtration. The acetone was removed by distillation. The residue contained two layers which were separated. The organic layer was dried over Attapulgus clay, and any unreacted ethyl α-chloroacetoacetate was removed in vacuo. A yield of 144 grams (90%) of ethyl α-(2-benzothiazolylmercapto)acetoacetate, an amber colored oily product was obtained. Calcd. for $C_{13}H_{13}NO_3S_2$

| | Calcd., percent | Found, percent |
|---|---|---|
| Nitrogen | 4.74 | 4.77 |
| Sulfur | 21.70 | 21.95 |

EXAMPLE 2

A solution of potassium 2-mercaptobenzothiazole was prepared by mixing 86.2 grams (0.5 mole) of 97% 2-mercaptobenzothiazole, 28.05 grams (0.5 mole) of potassium hydroxide, 700 ml. of acetone, and 22 grams of water. To this stirred solution 111.5 grams (0.5 mole) of β-bromoethyl levulinate was added. An exothermic reaction set in, the temperature rising from 30 to 48° C. within 5 minutes. The reaction mixture was stirred for 6 hours, and let stand for an additional 8 hours. The potassium chloride was recovered by filtration. The acetone was removed by distillation. The residue contained two layers which were separated. The organic layer was dried over Attapulgus clay and any unreacted β-bromoethyl levulinate was removed in vacuo. A yield of 144 grams (93%) of ethyl β-(2-benzothiazolylmercapto)-levulinate, an amber colored oily product, was obtained. Calcd. for $C_{14}H_{15}NO_3S_2$

| | Calcd., percent | Found, percent |
|---|---|---|
| Nitrogen | 4.53 | 4.47 |
| Sulfur | 20.73 | 20.50 |

EXAMPLE 3

A solution of potassium 2-mercaptobenzothiazole was prepared by mixing 86.2 grams (0.5 mole) of 97% 2-mercaptobenzothiazole, 28.2 grams (0.5 mole) of potassium hydroxide, 500 ml. of acetone and 22 grams of water. To this stirred solution 96.32 grams (0.5 mole) of butyl α-chloroacetoacetate was added. An exothermic reaction set in, the temperature rising from 25 to 52° C. within 5 minutes. The reaction mixture was stirred for 8 hours, and let stand for an additional 8 hours. The potassium chloride was recovered by filtration. The acetone was removed by distillation. The residue contained two layers which were separated. The organic layer was dried over Attapulgus clay and any unreacted butyl α-chloroacetoacetate was removed in vacuo. A yield of 129 grams (80%) of butyl α-(2-benzothiazolylmercapto) acetoacetate, an amber colored oily product, was obtained. Calcd. for $C_{15}H_{17}NO_3S_2$

|  | Calcd., percent | Found, percent |
|---|---|---|
| Nitrogen | 4.33 | 4.46 |
| Sulfur | 19.83 | 20.18 |

EXAMPLE 4

A solution of potassium 2-mercaptobenzothiazole was prepared by mixing 95 grams (0.55 mole) of 97% 2-mercaptobenzothiazole, 30.8 grams (0.55 mole) of potassium hydroxide, 2000 ml. of acetone and 22 grams of water. To this stirred solution 75.3 grams (0.5 mole) of methyl α-chloroacetoacetate was added. An exothermic reaction set in, the temperature rising from 28 to 49° C. within 5 minutes. The reaction mixture was stirred for 8 hours, and let stand for an additional 8 hours. The potassium chloride was recovered by filtration. Upon removal of the acetone a solid resulted. The precipitate was diluted with 500 ml. of water, filtered, washed with water until free of chloride, and dried at 50° C. The product, methyl α-(2-benzothiazolylmercapto) acetoacetate, M. P. 99–101° C., was obtained in 98% yield. After recrystallization from ethyl alcohol, it melted at 108–109° C. Calcd. for $C_{12}H_{11}NO_3S_2$

|  | Calcd., percent | Found, percent |
|---|---|---|
| Nitrogen | 4.98 | 5.00 |
| Sulfur | 22.79 | 22.92 |

EXAMPLE 5

A solution of potassium 2-mercaptobenzothiazole was prepared by mixing 95 grams (0.55 mole) of 97% 2-mercaptobenzothiazole, 30.8 grams (0.55 mole) of potassium hydroxide, 1000 ml. of acetone and 22 grams of water. To this stirred solution 67.28 grams (0.5 mole) of 3-chloro 2,4-pentanedione was added. An exothermic reaction set in, the temperature rising from 28 to 48° C. within 5 minutes. The reaction mixture was stirred for 8 hours and let stand for an additional 8 hours. The potassium chloride was recovered by filtration. Upon removal of acetone, a solid resulted. The precipitate was diluted with 500 ml. of water, filtered, washed with water until free of chloride, and dried at 50° C. The product, 3 - (2 - benzothiazolylmercapto)-2,4-pentanedione, M. P. 94–96° C. was obtained in 95.9% yield. After recrystallization from ethyl alcohol, it melted at 104–105° C. Calcd. for $C_{12}H_{11}NO_2S_2$

|  | Calcd., percent | Found, percent |
|---|---|---|
| Nitrogen | 5.28 | 5.49 |
| Sulfur | 24.17 | 23.98 |

The new compounds are useful herbicides and defoliants. For example spraying bean and corn plants with a 1% solution of methyl α-(2-benzothiazolylmercapto) acetoacetate killed and dried the foliage. Similar results were obtained with 3-(2-benzothiazolylmercapto)-2,4-pentanedione. Fungistatic and bacteristatic activity was exhibited by ethyl α-(2-benzothiazolylmercapto) acetoacetate.

Useful properties for accelerating the vulcanization of rubber are illustrated by the following test. Rubber compositions were compounded comprising

| Stock | A | B |
|---|---|---|
| Smoked sheets parts by weight | 100 | 100 |
| Zinc oxide do | 5 | 5 |
| Stearic acid do | 1 | 1 |
| Sulfur do | 3 | 3 |
| Ethyl α-(2-benzothiazolylmercapto)acetoacetate do | 1 | 0.7 |
| Diphenyl guanidine do |  | 0.3 |

The compositions were vulcanized in the usual manner by heating in a press for different periods of time at 135° C.

Table I

| Stock | Cure Time in Mins. | Modulus of Elasticity in lbs./in.² at Elongation of 500% | Tensile at Break in lbs./in.² | Ultimate Elongation, percent |
|---|---|---|---|---|
| A | 30 | 160 | 745 | 835 |
| B | 30 | 205 | 1,105 | 850 |
| A | 60 | 226 | 1,876 | 880 |
| B | 60 | 780 | 3,975 | 770 |

Other compositions were compounded comprising

| Stock | C | D |
|---|---|---|
| Pale crepe rubber parts by weight | 100 | 100 |
| Zinc oxide do | 5 | 5 |
| Stearic acid do | 1 | 1 |
| Sulfur do | 3 | 3 |
| 3-(2-Benzothiazolylmercapto)-2,4-pentanedione do | 1 |  |
| Methyl α-(2-benzothiazolylmercapto)acetoacetate do |  | 0.7 |

The stocks were vulcanized by heating in a press at 135° C. The physical properties of the vulcanizates are set forth below:

Table II

| Stock | Cure Time in Mins. | Modulus of Elasticity in lbs./in.² at Elongation of 500% | Tensile at Break in lbs./in.² | Ultimate Elongation, Percent |
|---|---|---|---|---|
| C | 30 | 255 | 1,865 | 875 |
| D | 30 | 815 | 3,390 | 860 |
| C | 60 | 465 | 2,770 | 825 |
| D | 60 | 890 | 3,060 | 660 |

The scorch resistance of these compositions was also evaluated by means of a Mooney plastometer at 135° C. Stock C was resistant to prevulcanization, indicating that the accelerator was of the delayed action type, the scorch time being 11 minutes at this temperature. Composition D showed rapid set up at 135° C. and more particularly a scorch time of 2 minutes at 135° C., indicating that this accelerator was active at relatively low temperatures.

Accelerating activity in a synthetic rubber composition is illustrated by tests carried out in GR–S 100, a rubbery copolymer of butadiene-1,3 and styrene. Compositions were compounded comprising

| Stock | E | F |
|---|---|---|
| Synthetic rubber parts by weight | 100 | 100 |
| Carbon black do | 50 | 50 |
| Saturated hydrocarbon softener do | 10 | 10 |
| Zinc oxide do | 4 | 4 |
| Stearic acid do | 2 | 2 |
| Sulfur do | 1.75 | 1.75 |
| Acetone/p-amino biphenyl condensation product do | 1.5 | 1.5 |
| 3-(2-Benzothiazolylmercapto)-2,4-pentanedione do | 0.7 |  |
| Diphenyl guanidine do | 0.5 | .05 |
| Methyl α-(2-benzothiazolylmercapto)acetoacetate do |  | 0.7 |

The compositions were vulcanized by heating in a press for 90 minutes at 144° C. The physical properties are set forth below:

Table III

| Stock | Modulus of Elasticity in lbs./in.² at Elongation of 500% | Tensile at Break in lbs./in.² | Ultimate Elongation, Percent |
|---|---|---|---|
| E | 1,410 | 1,460 | 506 |
| F | 1,490 | 1,680 | 545 |

It is intended to cover all changes and modifications of the examples of the invention herein chosen for purposes of disclosure which do not constitute departures from the spirit and scope of the invention.

What is claimed is:

1. A compound of the structure

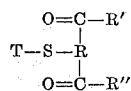

where T represents a radical selected from the group consisting of 4,5-di(lower alkyl) 2-thiazolyl, 4-(lower alkyl) 2-thiazolyl, arylene hydrocarbon 2-thiazolyl containing less than 14 carbon atoms, chloro substituted 2-benzothiazolyl, 4-(lower alkyl) 5-(lower carboalkoxy) 2-thiazolyl and 4-(lower alkyl) 5-acetyl 2-thiazolyl radicals, R represents a lower alkylene group, R' is selected from the group consisting of alkyl radicals containing less than 11 carbon atoms and alkoxy radicals containing less than 10 carbon atoms and R" represents an alkyl radical containing less than 10 carbon atoms.

2. A compound of the structure

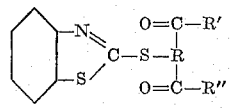

where R represents an alkylene group of less than three carbon atoms, R' and R" represent alkyl groups containing less than 11 carbon atoms.

3. A compound of the structure

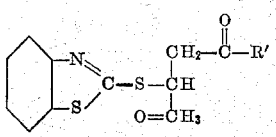

where R' represents an alkyl group of less than 11 carbon atoms.

4. A compound of the structure

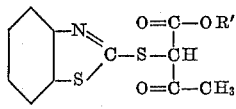

where R' represents an alkyl group of less than 5 carbon atoms.

5. Ethyl α-(2-benzothiazolylmercapto)acetoacetate.
6. Ethyl β-(2-benzothiazolylmercapto)levulinate.
7. Butyl α-(2-benzothiazolylmercapto)acetoacetate.
8. Methyl α-(2-benzothiazolylmercapto)acetoacetate.
9. 3-(2-benzothiazolylmercapto)-2,4-pentanedione.
10. The process which comprises condensing a mercaptothiazole from the group consisting of 4,5-di(lower alkyl) 2-mercaptothiazoles, 4-(lower alkyl) 2-mercaptothiazoles, arylene hydrocarbon 2-mercaptothiazoles containing less than 14 carbon atoms, chloro substituted 2-benzothiazoles, 4-(lower alkyl) 5-(lower carboalkoxy) 2-mercaptothiazoles and 4-(lower alkyl) 5-acetyl 2-mercaptothiazoles with a halogenated alkylene dicarbonyl compound of the structure

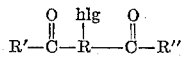

where R represents a lower alkyl group, R' is selected from the group consisting of alkyl groups containing less than 11 carbon atoms and alkoxy groups containing less than 10 carbon atoms and R" represents an alkyl radical containing less than 10 carbon atoms.

11. The process which comprises condensing mercaptobenzothiazole with an α-chloroacetoacetate.

12. The process which comprises condensing mercaptobenzothiazole with a β-halogen substituted ester of levulinic acid.

References Cited in the file of this patent

UNITED STATES PATENTS

| 2,088,022 | Williams | July 27, 1937 |
| 2,136,949 | Orthner | Nov. 15, 1938 |